United States Patent [19]
Tomizawa

[11] Patent Number: 4,584,455
[45] Date of Patent: Apr. 22, 1986

[54] LASER BEAM MACHINING APPARATUS

[75] Inventor: Yukio Tomizawa, Tokyo, Japan

[73] Assignee: NEC Corporation, Japan

[21] Appl. No.: 524,147

[22] Filed: Aug. 18, 1983

[30] Foreign Application Priority Data

Aug. 20, 1982 [JP] Japan ................................ 57-144322

[51] Int. Cl.⁴ ............................................. B23K 26/04
[52] U.S. Cl. ........................ 219/121 LH; 219/121 LZ;
219/121 LS; 219/121 LQ; 219/121 LU;
356/153
[58] Field of Search ................... 219/121 LX, 121 LU,
219/121 LW, 121 LZ, 121 LP, 121 LQ, 121
LR, 121 LS; 356/152, 153

[56] References Cited

U.S. PATENT DOCUMENTS 3,902,036 8/1975 Zaleckas .................. 219/121 LX X
4,213,704 7/1980 Burns et al. ...................... 356/152 X
4,319,839 3/1982 Durran .................................. 356/153

FOREIGN PATENT DOCUMENTS 2320525 4/1977 France ............................ 219/12 LW
2083217 3/1982 United Kingdom .......... 219/121 LX Primary Examiner—M. H. Paschall
Attorney, Agent, or Firm—Ostrolenk, Faber, Gerb & Soffen

[57] ABSTRACT

A laser beam machining apparatus includes a working laser beam for machining a workpiece and a visible laser beam which is made coincident therewith. The coincident laser beams are scanned along the X-Y plane of a surface to be machined by a pair of optical scanners. The movement of the optical scanners is controlled as a function of machine signals indicative of the desired movement of the laser beam and compensation signals indicative of the temperature drift of the optical scanners. A camera detects the instantaneous position of the visible lens as it is scanned along the surface to be machined and generates output signals indicative thereof. The output signals are compared to the machining signals to determine the temperature drift of the optical scanners and the compensating signals are generated as a function thereof.

8 Claims, 10 Drawing Figures

LASER BEAM MACHINING APPARATUS

BACKGROUND OF THE INVENTION

The present invention relates to a laser beam machining apparatus, and more particularly to a laser beam machining apparatus with an improved optical scanner control circuit.

Figure 1:
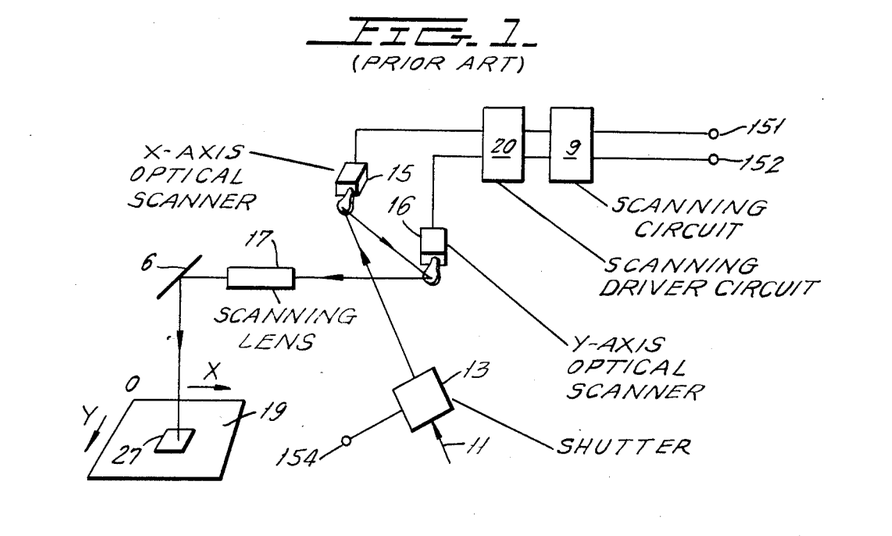
FIG. 1 outlines a prior art laser beam machining apparatus.

Laser beam machining apparatus conventionally used for the trimming of thick film resistors or like purposes are typically constructed as illustrated in FIG. 1, wherein a laser beam 11 is permitted to pass a shutter 13 when a logical "1" signal is fed to its input terminal 154 and is blocked by the shutter 13 when a logical "0" signal is given fed thereto. A scanning circuit 9 generates digital signals indicative of the quantities of shift towards coordinates $(X_1, Y_1)$ on the XY plane 19 of a surface to be machined. On input terminals 151 and 152 are set the quotients of the division of the coordinates $(X_1, Y_1)$ on the XY plane 19 of the surface to be machined by the respective position resolving powers of optical scanners corresponding to the minimal quantities of shift. These digital quantities are converted to analog values in a scanner driving circuit 20 to drive an X-axis optical scanner 15 and Y-axis optical scanner 16. The laser beam 11 incident on both the X-axis optical scanner 15 and on the Y-axis optical scanner 16 is focused by a scanning lens 17, by way of a totally reflective mirror 6, on the surface to be machined.

Figure 2:
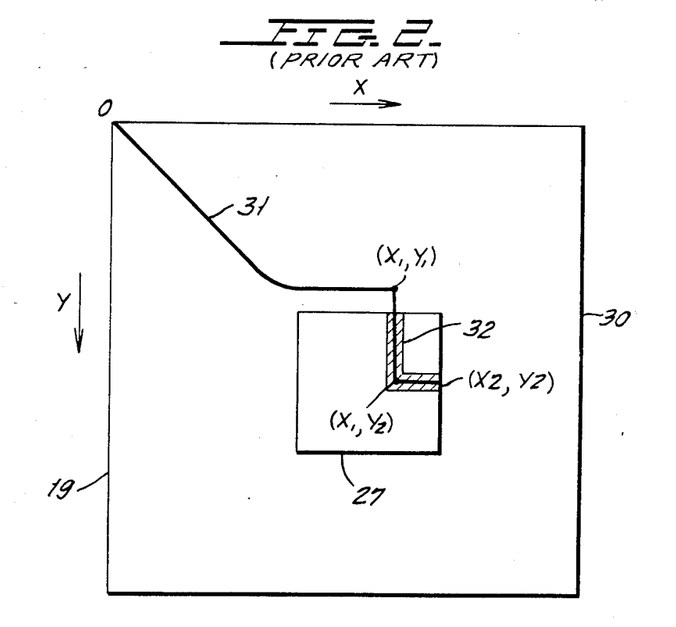
FIG. 2 illustrates the scanning-machining process to describe the operation of the prior art laser beam machining apparatus.

FIG. 2 illustrates the action of the conventional laser beam machining apparatus on the XY plane 19 of the surface to be machined. The position resolving powers of the X-axis optical scanner 15 and Y-axis optical scanner 16 are assumed to be 10 μm each, if a value of $X_1/10$ is fed to the input terminal 151 of the scanning circuit 9 and another value of $Y_1/10$ to the input terminal 152 of same, the laser beam 11 will be caused by the optical scanners 15, 16 to scan the XY plane 19 of the surface to be machined until it reaches the coordinates $(X_1/Y_1)$, where it will stop. Then, when the value of $X_1/10$ is fed to the input terminal 151 of the scanning circuit 9 and another value of $Y_2/10$ to the input terminal 152 of same, said laser beam 11 will scan the XY plane 19 of the surface to be machined from the coordinates $(X_1/Y_1)$ to another pair of coordinates $(X_1, Y_2)$ thereon, and stop at the latter.

Then, by feeding a value of $X_2/10$ to the input terminal 151 of the scanning circuit 9 and another value of $Y_2/10$ to the input terminal 152 of same, said laser beam 11 is caused to scan the XY plane 19 of the surface to be machined from the coordinates $(X_1, Y_2)$ to coordinate $(X_2, Y_2)$, where it stops. Reference numerals 30 and 31, respectively, represent the scanning range and the scanning locus of the laser beam 1 on the XY plane 19 of the surface to be machined, and 32 presents the area of the workpiece 27 to be laser beam-machined on the surface to be machined.

Figure 3:
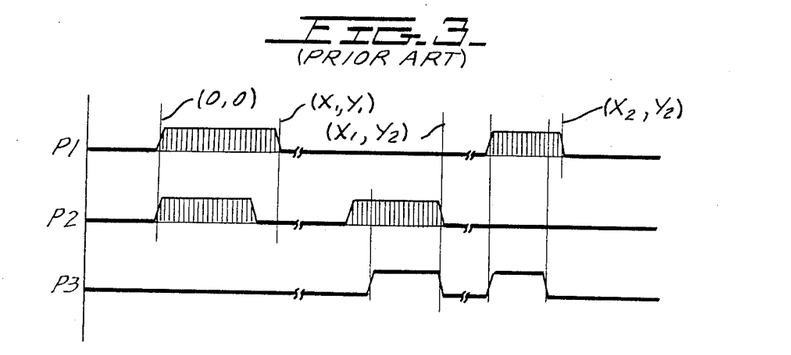
FIG. 3 illustrates a timing chart for describing the operation of the prior art laser beam machining apparatus.
Figure 4:
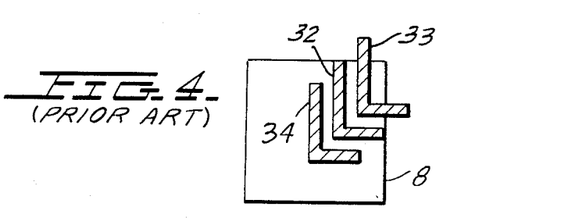
FIG. 4 illustrates some results of laser beam machining by prior art.

Laser beam machining of a workpiece 27 is accomplished according to a timing chart shown in FIG. 3. P1, P2 and P3 are input signals to the input terminals 151 and 152 of the scanning circuit 9 and the input terminal 154 of the shutter 13, respectively. Unless the optical scanners 15, 16 drift due to temperature variation, machining will be achieved as represented by reference numeral 32 in FIG. 4. However, as optical scanners in any practical situation are subject to temperature drift, there will be a deviation on the XY plane 19 of the surface to be machined from the prescribed coordinates. Therefore, in trimming thick film resistors or the like, temperature drift will make it impossible for the laser beam machining of the workpiece to be accomplished in area 32, and instead causes it to take place either in area 33 or 34 (FIG. 4), inviting an insufficient accuracy of the thick film resistance or some other defects in the product.

SUMMARY OF THE INVENTION

An object of the invention, therefore, is to provide a laser beam machining apparatus free from the aforementioned disadvantages and capable of automatically compensating for the temperature drift quantities of optical scanners and thereby making possible highly precise machining.

According to the present invention, a laser beam machining apparatus comprises:

means for optically coupling a first laser beam used for machining a workpiece with a second laser beam used to detect the position of said workpiece such that the optical axes of said first and second laser beams are coincident with one another;

optical scanner means for deflecting said coincident laser beams received from said coupling means and for scanning, along two dimensions, the surface of a workpiece supporting table with said deflected beams, said optical scanning means carrying out the scanning operation as a function of both input machine data signals indicative of the desired scanning operation of said optical scanner means and compensation signals indicative of the temperature drift of said optical scanning means;

camera means for detecting the location of said second laser beam as it is scanned along said workpiece supporting table and for generating beam position signals indicative of the position of said second laser beam on said workpiece supporting table; and compensation circuit means for generating said compensation signals as a function of both said position signals and said input machine data signals.

According to the specific feature of the invention, a laser beam machining apparatus comprises: a working laser beam focused into an infinitesimal spot diameter for machining a workpiece; a shutter for turning on and off the machining laser beam; a half mirror receiving both said machining laser beam and a visible laser beam so as to cause the optical axis of said laser beams to be coincident with one another; optical scanners for causing the coincident laser beams to scan the XY plane of a surface to be machined by way of a scanning lens and a dichroic mirror; a scanning circuit for generating digital signals for controlling the movement of said optical scanners as a function of machining signals indicative of the desired movement of said optical scanners and compensation signals indicative of the temperature drift of said optical scanners; a scanner driving circuit for driving said optical scanners as a function of said digital signals; photoelectric converter means for detecting the position of said visible beam as it is scanned across said surface to be machined and for generating image signals as a function thereof; a wave form shaping circuit for converting said image signals into sliced signals of two values according to a threshold value; a central coordinate detecting circuit for detecting the central coordinates of said image signals as a function of said sliced signals and for generating coordinate signals indicative thereof; and a compensa-

DETAILED DESCRIPTION OF A PREFERRED EMBODIMENT

A preferred embodiment of the present invention will be described in further detail below with reference to the drawings.

Figure 5:
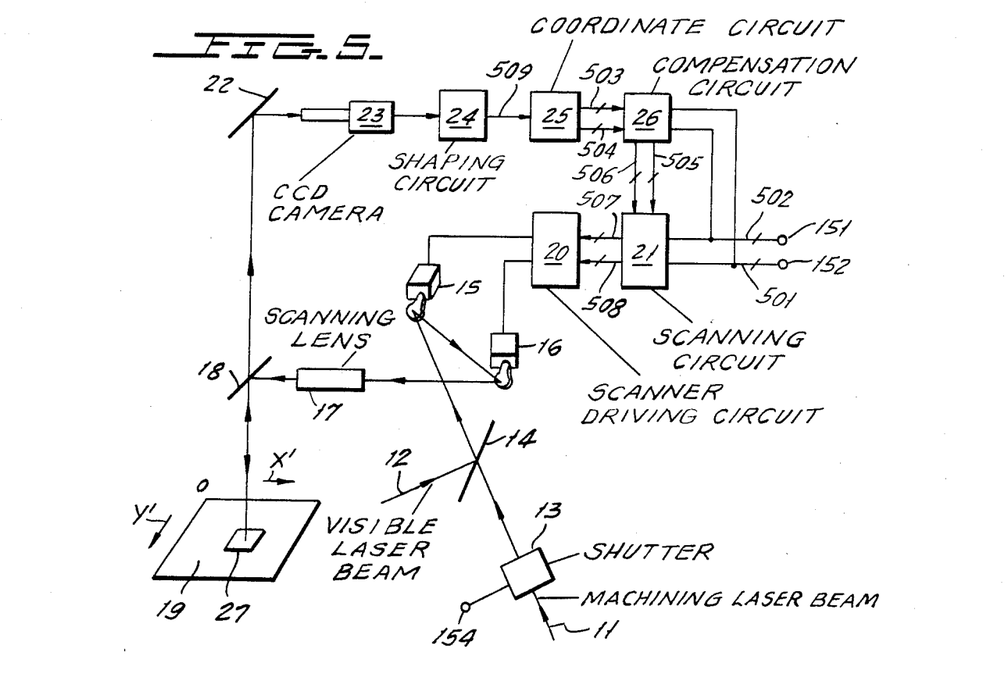
FIG. 5 illustrates a laser beam machining apparatus according to the present invention.

In FIG. 5, the embodiment of the invention includes, in addition to the constituent elements of the prior art apparatus earlier described: a visible laser beam 12; a dichroic mirror 14 which reflects the visible laser beam 12 and almost wholly transmits a machining laser beam 11; a mirror 18 which almost wholly reflects the machining laser beam 11, and reflects half and transmits half of the visible laser beam 12; a totally reflective mirror 22; a CCD pick-up camera 23; a wave form shaping circuit 24; a coordinate circuit 25 for generating coordinate signals corresponding to the coordinates of a spot image in the viewing field of the CCD pick-up camera from shaped signals, and a compensation circuit 26 for supplying compensation signals by comparing the coordinates in the viewing field and initial inputs. It further includes a scanner circuit 21 for electrically compensating for drifts in response to compensation signals from the compensation circuit 26 and supplying machining signals for machining the desired position out of ensuing input signals.

The scanning circuit 21 outputs machining signals as X-axis digital signals and Y-axis digital signals, which, after being converted into analog signals in a scanner driving circuit 20, are amplified and supplied to an X-axis optical scanner 15 and Y-axis optical scanner 16, respectively. Each of the optical scanners 15, 16 is of the known galvanometer type, and the inclination of a mirror fitted to its shaft is varied by regulating the driving current thereof.

The visible laser beam 12 is so reflected by the dichroic mirror 14 as to concur with (be coincident with) the optical axis of the machining laser beam 11, enters into and is reflected by an X-axis optical scanner 15, then goes to and is reflected by a Y-axis optical scanner 16, enters into a scanning lens 17 which is so adjusted as to focus the beam on a workpiece 27, and is reflected by a mirror 18 to be focused on the workpiece 27 on a workpiece supporting table 19. The CCD pick-up camera 23 holds within its viewing field a focal spot 35 (FIG. 9) of the visible laser beam 12 on the workpiece 27.

Figure 9:
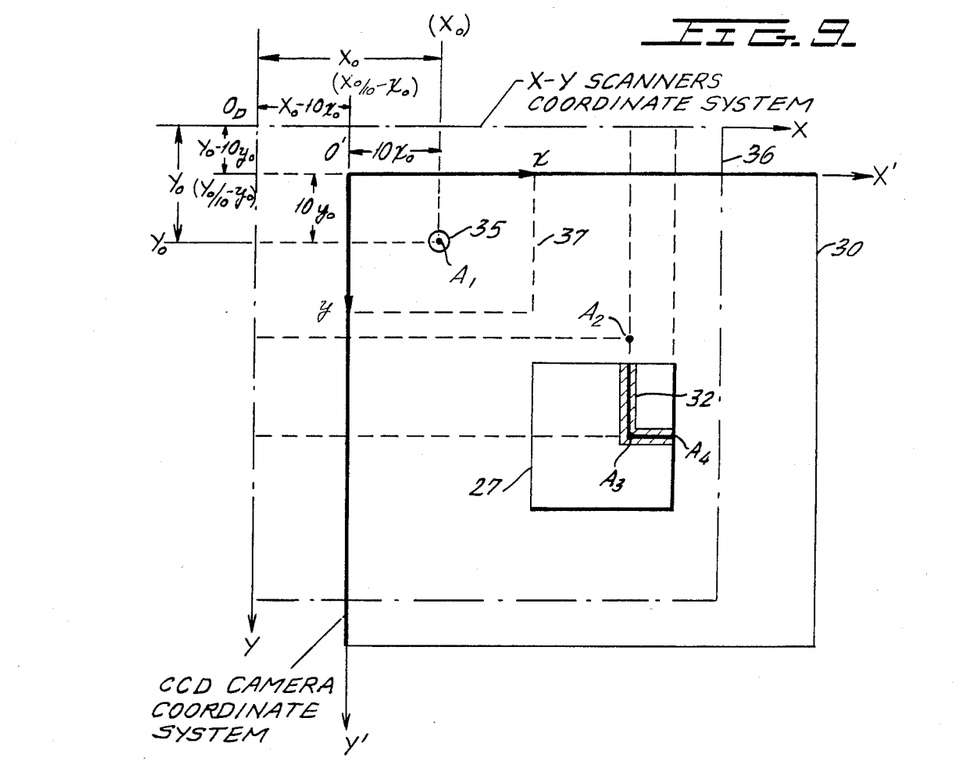
FIG. 9 illustrates a system of coordinates to describe the operation of an embodiment of the invention.

Understanding of the present invention will be further facilitated by the explanation hereunder of the coordinate system used in this preferred embodiment with reference to FIG. 9.

An X'Y' coordinate system having an origin O', is established on the workpiece supporting table 19. The coordinates (X', Y') are expressed in microns. The viewing field 37 of the CCD camera 23 is represented by an xy coordinate system, whose origin, x axis, and y axis are so established as to concur with the corresponding elements of the X'Y' coordinate system. In the xy coordinate system, the coordinates (x, y) are expressed in tens of microns (corresponding to the resolving power of the CCD camera 23). Accordingly, the real length is equal to each coordinate multiplied by 10 microns.

If an XY coordinate system positioned within the scanning range of XY scanners concurs (is coincident) with the X'Y' coordinate system established on the supporting table at a certain level of room temperature, the drift of the XY scanners at another level of temperature will displace (in a parallel manner) the scanning range of the scanners from the area indicated by line 30 to the area indicated in phantom by line 36. Therefore, in order to machine the desired position on the table, the parallel drift has to be compensated for.

Referring back to FIG. 5, the scanning circuit 21, in response to a value of $X_0/10$ (divided by 10 because the resolving power of the scanners is 10 microns) and a value of $Y_0/10$ applied to input terminals 151 and 152, outputs digital driving signals for the X-axis optical scanner 15 and the Y-axis optical scanner 16. These output signals, applied as input signals to the scanner driving circuit 20 are converted into analog signals and drive the X-axis optical scanner 15 and the Y-axis optical scanner 16 to bring the focal spot 35 of the visible laser beam 12 incident on the coordinates $(X_0, Y_0)$ of the XY coordinate system by way of the scanning lens 17 and the dichroic mirror 18. The visible laser beam image of the coordinates of this XY coordinate system is picked up by the CCD camera 23 by way of the mirror 18 and a 45° reflective mirror 22. The video signals of the CCD camera 23 are sliced into shaped or two-valued (binary) signals by the wave form shaping circuit 24 as the scanning proceeds. The shaped signals are further supplied to the coordinate circuit 25, which first samples the signals with a high-speed clock (whose frequency is determined by the resolving power), and then detects, and generates as its output signals, coordinates $(x_0, y_0)$ to constitute the center of the spot in the xy coordinate system out of the picture elements representing the "H" level among the sampled video signals.

The compensation circuit 26, figuring out the deviation of the XY coordinate system from the X'Y' coordinate system on the basis of the coordinates $(x_0, y_0)$ of the xy coordinate system, and outputs compensation signals $\Delta X$ and $\Delta Y$ as a function thereof. As is evident from FIG. 9, the extent of drift is $X_0 - 10x_0$ in the X direction and $Y_0 - 10y_0$ in the Y direction. The compensation circuit 26 supplies the scanning circuit 21 with an X-directional coordinate of $X_0/10 - x_0$ and a y-directional coordinate of $Y_0/10 - y_0$ as $\Delta X$ and $\Delta Y$, respectively.

The laser beam 11 passes the dichroic mirror 14 when a logic "1" signal is fed to a terminal 154 to open a shutter 13. As a signal of $X_1/10$ is fed to the input terminal 151 and another of $Y_1/10$ to the input terminal 152, the scanning circuit 21 is driven, and the scanner driving circuit 20 causes the X-axis optical scanner 15 and the Y-axis optical scanner 16 to scan the XY plane and to stop at a point $A_2$ (FIG. 9), having coordinates $(X_1+10\ \Delta X, Y_1+10\ \Delta Y)$ in the XY coordinate system. Then, as another signal of $Y_2/10$ is given to the input terminal 152, the Y-axis optical scanner 16 is caused to scan the plane and stop at another point $A_3$ (FIG. 9), having coordinates $(X_1+10\ \Delta X, Y_2+10\ \Delta Y)$ in the XY coordinates system. Next, when another signal of $X_2/10$ is supplied to the input terminal 151, the X-axis optical scanner 15 is caused to scan the plane and stop at yet another point $A_4$ (FIG. 9), having coordinates $(X_2+10\ \Delta X, Y_2+10\ \Delta Y)$ in the XY coordinate system. By feeding signals of logic "1" to the input terminal 154 during the scanning period referred to above, the workpiece 27 is machined.

Figure 10:
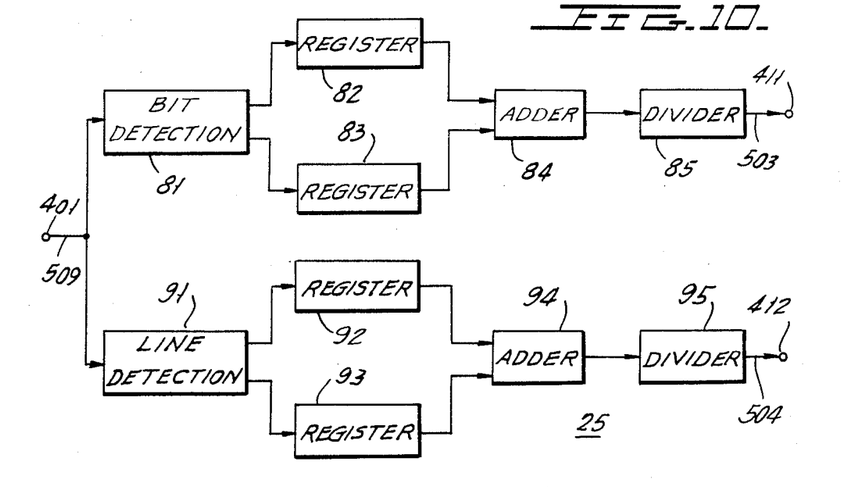
FIG. 10 is a block diagram of a central coordinate detection circuit for use in FIG. 5.

FIG. 10 illustrates an example of the central coordinate detection circuit 25 of FIG. 5. The output of the wave form shaping circuit 24 is supplied to a bit detection circuit 81 and a line detection circuit 91. The bit detection circuit takes the logical sum of the shaped video signals on line 509 and then picks up the sampling clock pulses, at the times the sum changes from logic "0" to "1" from logic "1" to "0", which in turn are stored in a bit start register 82 and a bit end register 83, respectively. The data retained in the registers 82 and 83 are added in a first adder 84 in a scan end, and then divided by two in a first divider which produces a coordinate $x_0$ which is applied to line 503. The line detection circuit 91 detects a horizontal synchronizing clock pulse as representing a start line in which the shaped video signal of a line changes from the state of logic "0" to the state including logic "1" and another horizontal synchronizing clock pulse as representing an end line in which the state including logic "1" changes to that of all logic "0" in a scanning line signal. The horizontal synchronizing clock pulses mentioned above are stored in start line register 92 and an end line register 93, whose data are added in a second adder 94 and divided by two at a second divider 95 to produce a $y_0$ coordinate which is applied to line 504. The central coordinate detection circuit 25 thus produces central coordinates $(x_0, y_0)$ of the spot image.

Figure 6:
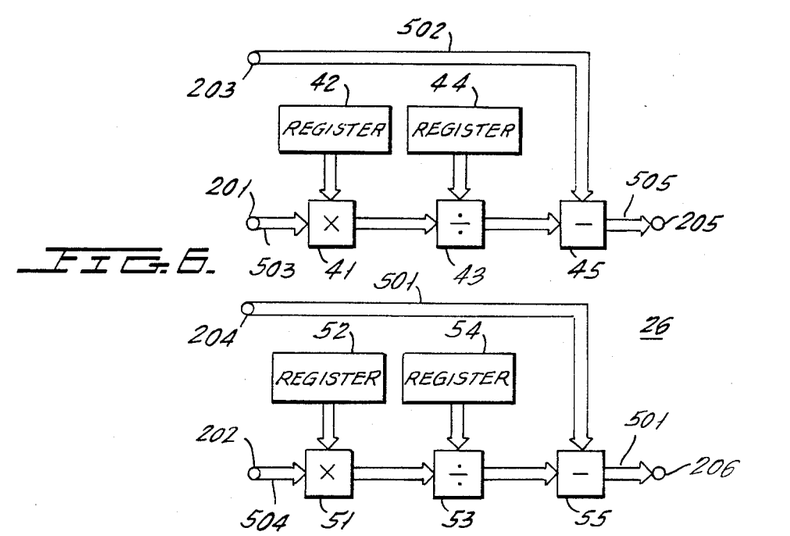
FIG. 6 is a detailed block diagram of a compensation circuit.

FIG. 6 illustrates one example of the compensation circuit 26 referred to in FIG. 5, wherein an x coordinate, $x_0$, is multiplied in a first multiplier 41 by the output of a first register 42 (for instance Texas Instruments' SN74LS175L), in which the value 10 of the position resolving power of the CCD camera in the x direction is set. A divider 43 divides the output of said multiplier 41 with the output of a second register 44, in which the value 10 of the resolving power of the X-axis optical scanner is set. The resultant quotient $(x_0)$ is subtracted from $X_0/10$ (fed to a terminal 203) by a subtractor 45, and the difference is supplied to an output terminal as a compensation for X, $\Delta X = X_0/10 - x_0$. At the same time, a y coordinate $y_0$ supplied to an input terminal 202 is multiplied in a second multiplier 51 by the output of a third register 52, in which the value 10 of the resolving power of the CCD camera in the y direction is set. A divider 53 divides the output of said multiplier 51 with the output of a fourth register 54 in which the value 10 of the positional resolving power of the Y-axis optical scanner is set. The resultant quotient $(y_0)$ is subtracted by a subtractor 55 from $Y_0/10$ fed to a terminal 204, and the difference is supplied to an output terminal 206 as a compensation for Y, $\Delta Y = Y_0/10 - y_0$.

Figure 7:
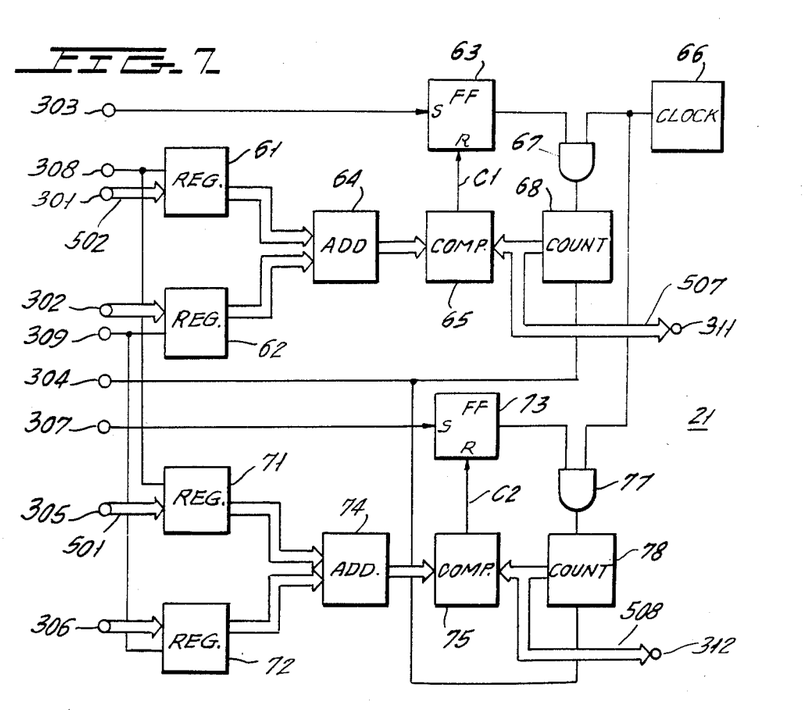
FIG. 7 is a detailed block diagram of a scanning circuit.

FIG. 7 is one example of the scanning circuit 21 shown in FIG. 5, which will be described with reference to the timing chart of FIG. 8. When $X_0/10$ is fed to an input terminal 301 and a strobe signal to another input terminal 308, a value of $X_0/10$ is latched to a fifth register 61. At this time, an initial value of 0 is latched to a sixth register 62. A strobe signal (Q7 in FIG. 8) ST1 applied to an input terminal 303 at this time sets the output of a first flipflop 63 to logic "1" level. Reference numeral 66 represents a clock circuit, whose output signal is represented by Q1 in FIG. 8. The logical product of this signal and the output signal of the first flipflop 63 is applied by an AND gate 67 to the count input of a first counter 68 (consisting, for instance, of Texas Instruments' SN74LS193N or the like). The count in counter 68 (Q2 in FIG. 8) and the output signal $X_0/10$ of a first adder 64 (for instance Texas Instruments' SN74LS83AN) are compared by a first comparator 65 (for instance Texas Instruments' SN74LS85N), and a signal C1 is generated by comparator 65 when the two signals are equal. This output resets the flipflop 63 to cause its output signal to return to the logic "0" level. $Y_0/10$ is fed to a terminal 305 simultaneously with the feeding of $X_0/10$ to the input terminal 301, and a strobe signal (Q8 in FIG. 8) ST4 is applied to a terminal 307 of a second flipflop 73 causing the output of the flipflop to be set at the logic "1" level. The logical product of the output of the clock circuit 66 and the second flipflop 73 is applied by an AND gate 77 to the upcount input terminal of a second counter 78. The count in counter 78 (Q3 in FIG. 8) and the output signal $Y_0/10$ of a second adder 74 are compared by a second comparator 75, and a signal C2 is generated by counter 75 when the two signals are equal. This signal resets the second flipflop 73 to cause its output signal to return to the logic "0" level.

Figure 8:
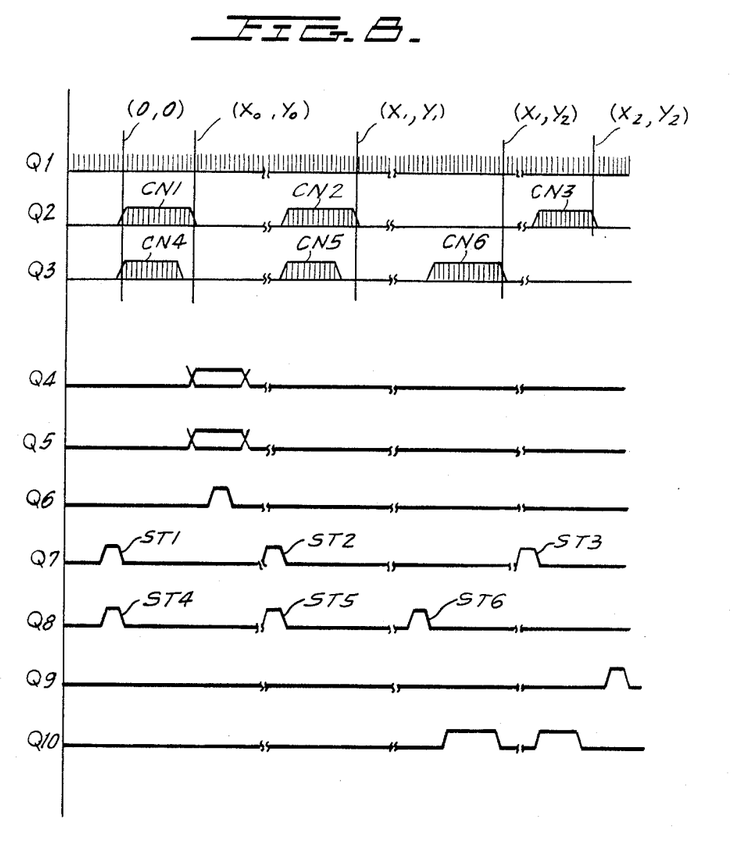
FIG. 8 illustrates a timing chart for describing the operation of the scanning-circuit.

At this time, the count CN1 in counter 68 represented by Q2 in FIG. 8 is applied to an output terminal 311 and represents the shift quantity of the laser beam in the X direction and the count CN4 in counter 78, represented by Q3 in FIG. 8 is applied to terminal 312 and represents the shift quantity of the laser beam in the Y direction, so that the optical scanners continue their scanning to and stop at the coordinates $(X_0, Y_0)$ of the XY system. Next, the compensation $\Delta X$ for X, detected by the compensation circuit 26 in FIG. 5, is fed to an input terminal 302 at the timing of Q4 in FIG. 8, and as a strobe signal of Q6 in FIG. 8 is applied to another input terminal 309, $\Delta X$ is latched to the sixth register 62 at, for instance, the leading edge of this strobe signal. The compensation $\Delta Y$ for Y, detected as described above simultaneously with said compensation $\Delta X$, is fed to an input terminal 306 at the timing of Q5 in FIG. 8 and latched to an eighth register. Further as $X_1/10$ is fed to the input terminal 301 and a strobe signal to the input terminal 301 and a strobe signal to the input terminal 308, the value of $X_1/10$ is latched to the fifth register 61. At this time, the value of $\Delta X$ is already latched in the sixth register 62. Then, the first flipflop 63 returned to logic "1" level by a strobe signal (Q7 in FIG. 8) ST2 applied to the input terminal 303. The logical product of the output signal of the clock circuit 66 and that of the first flipflop 63 is applied by AND gate 67 to the upcount input terminal of the first counter 68. The count CN2 in counter 68 is compared to the output signal $X_1/10+\Delta X$ of the first adder 64 by the first comparator 65, and the signal C1 generated when the two signals are equal. This resets the first flipflop 63 to return to its output to the logical "0" level. At the same time, $Y_1/10$ is applied to the input terminal 305, and the second flipflop 73 is returned to logic "1" level by a strobe signal (Q8 in FIG. 8) ST5 applied to the terminal 308. The logical product of the clock circuit 66 and the second flipflop 73 is applied by the AND gate 77 to the upcount terminal of the second counter 78. The count in counter 78 (Q3 in FIG. 8) and the output signals $Y_1/10=\Delta Y$ are compared by the second comparator 75, and the signal C2 is outputted when the two signals are equal. This resets the second flipflop 73 to cause its output signal to return to the logic "0" level.

At this time, the signal CN2 represented by Q2 in FIG. 8 is supplied to the output terminal 311 and the signal CN5, represented by Q3 in FIG. 8, to the output terminal 312, so that the optical scanners continue their scanning to stop at the coordinates ($X_1+10 \Delta X$, $Y_1+10 \Delta Y$) on the surface to be machined.

Then, $Y_2/10$ is fed to the input terminal 305, and a strobe signal (Q8 in FIG. 8) ST6 causes the second flipflop 73 to be set at the logic "1" level. The logical product of the output signal of the clock circuit 66 and the second flipflop 73 is applied by AND gate 77 to the upcount input terminal of the second counter 78. The count CN6 in counter 78 (Q3 in FIG. 8) and the output signal $Y_2/10+\Delta Y$ of the second adder 74 are compared by the second comparator 75, and the signal C2 is outputted when the two signals are equal. This resets the second flipflop 73 to cause its output signal to return to the logic "0" level. At this time, the signal CN6 represented by Q3 in FIG. 8 is supplied to the terminal 312, so that the optical scanners continue their scanning to and stop at the coordinates ($X_1+10 \Delta X$, $Y_2+10 \Delta Y$). Next, $X_2/10$ is fed to the input terminal 301, and a strobe signal (Q8 in FIG. 8) ST3 applied to the terminal 308 to set the first flipflop 63 to the logic "1" level. The logical product of the output signal of the clock circuit 66 and the first flipflop 63 is applied by the AND gate 67 to the upcount terminal of the first counter 68. The count CN3 in counter 68 (Q2 in FIG. 8) and the output signal $X_2/10+\Delta X$ are compared by the first comparator 65, and the signal C1 is outputted when the two signals are equal. This resets the first flipflop 73 to return the output signal to the logic "0" level. At this time, the signal CN3 represented by Q2 in FIG. 8 is supplied to the output terminal 311, so that the optical scanners continue their scanning to and stop at the coordinates ($X_2+10 \Delta X$, $Y_2+10 \Delta Y$) on the surface to be machined.

Then, by generating a reset signal represented by Q10 in FIG. 8, the first counter 68 and the second counter 78 are reset, so that 0 is outputted to the output terminals 311 and 312 to stop the optical scanners at the coordinates (0, 0) on the surface to be machined. As the operation of the scanning circuit is accomplished according to the timing chart of FIG. 8, an area 32 to be machined can be duly machined by opening the shutter of the laser at the timing of Q10 in FIG. 8.

As described above, according to the present invention, coordinates on the XY plane of the surface to be machined can be accurately controlled by detecting the temperature-drift quantities of optical scanners with a visible laser beam and compensating the preset value of the scanning circuit for the temperature-drift quantities so detected. Therefore, even if long-term drift is caused by temperature variations of optical scanners, such drift quantities can be automatically compensated to machine the workpiece in its desired position.

What is claimed is:

1. A laser beam machining apparatus, comprising:
a first laser for generating a first laser beam used for machining a workpiece;
a second laser for generating a second laser beam used to detect the position of said workpiece;
means for optically coupling said first and second laser beams such that their optical axes are coincident with each other;
optical scanner means for deflecting said coincident laser beams received from said coupling means and for scanning, along two dimensions, at least a portion of the surface of a workpiece supporting table with said deflected beams;
a scanner circuit responsive to input machining data for producing scan signals for said optical scanner means;
a scanner driving circuit responsive to said scan signals for driving said optical scanner means;
a pick-up camera, so positioned that its viewing field covers a specified area on said workpiece supporting table which area encompasses the area being scanned by said coincident laser beams, said pick-up camera scanning said area and producing video signals indicative of an image of said specified area and therefore including video information representative of the position of said second laser beam on said specified area;
wave form shaping means for converting said video signals into sliced signals;
coordinate signal generating means for generating, as a function of said sliced signals, coordinate signals indicating the location of said second laser beam on said specified area; and
compensation signal generating means for generating, from said coordinate signal and said input machining data, compensation signals indicative of the drift of said optical scanner means, said scanning circuit achieving compensation for the drive in response to said compensation signals.

2. A laser beam machining apparatus, comprising:
a first laser for generating a first laser beam used for machining a workpiece;
a second laser for generating a second laser beam used to detect the position of said workpiece;
means for optically coupling said first and second laser beams such that their optical axes are coincident with each other;
optical scanner means for deflecting said coincident laser beams receiving from said coupling means and for scanning, along an X-Y coordinate system, the surface of a workpiece supporting table with said deflected beams;
a scanner circuit, responsive to input signals $X/a_0$ and $Y/a_0$, which signals are obtained by dividing the X and Y coordinates of an X-Y coordinate system which is scanned by said optical scanner means by the positional resolving power $a_0$ of said optical scanner means, for producing digital quantities corresponding to the amount of shift of said laser beams;
a scanner driving circuit responsive to analog signals converted from said digital quantities for driving said optical scanner means;

a pick-up camera, so positioned that its viewing field covers a specified area on said workpiece supporting table which area encompasses the area being scanned by said coincident laser beams, said pick-up camera scanning said specified area and producing video signals indicative of an image of said specified area and therefore including video information representative of the position of said second laser beam on said specified area;

wave form shaping means for converting said video signals into sliced signals;

coordinate signal generating means for generating as a function of said sliced signals, coordinate signals $x_0$ and $y_0$ corresponding to the coordinates of said second laser beam on said specified area; and compensation signal generating means for generating, as a function of said coordinate signals $x_0$ and $y_0$ and input signals $X/a_0$ and $Y/a_0$ which are supplied to said scanner circuit, compensation signals corresponding to the temperature drift of said optical scanners, said scanning circuit achieving compensation for the drift in response to said compensation signals.

3. A laser beam machining apparatus, comprising:
a working laser beam focused into a spot for machining a workpiece;
a shutter for selectively passing said machining laser beam;
a half-mirror receiving both said machining laser beam and a visible laser beam so as to cause the optical axes of said laser beams to be coincident with one another;
optical scanners for receiving said coincident laser beams and for causing said laser beams to scan the X-Y plane of a surface to be machined by way of a scanning lens and a dichroic mirror;
a scanning circuit for generating digital signals for controlling the movement of said optical scanners as a function of machining signals indicative of the desired movement of said optical scanners and compensation signals indicative of the temperature drift of said optical scanners;
a scanner driving circuit for driving said optical scanners as a function of said digital signals;
a pick-up camera so positioned that its viewing field covers a specified area on said workpiece support table which area encompasses the area being scanned by said coincident laser beams, said pick-up camera scanning said specified area and producing video signals indicative of an image of said specified area and therefore including video information representative of the position of said second laser beam on said specified area;
a wave form shaping circuit for converting said image signals into binary signals;
a central coordinate detecting circuit for detecting the central coordinates of said image signals as a function of said binary signals and for generating coordinate signals indicative thereof; and
a compensating detecting circuit responsive to both said coordinate signals and said machining signals for generating said compensating signals.

4. A laser beam machining apparatus, comprising:
means for optically coupling a first laser beam used for machining a workpiece with a second laser beam used to detect the position of said workpiece such that the optical axes of said first and second laser beams are coincident with one another;

optical scanner means for deflecting said coincident laser beams received from said coupling means and for scanning, along two dimensions, the surface of a workpiece supporting table with said deflected beams, said optical scanning means carrying out the scanning operation as a function of both input machine data signals indicative of the desired scanning operation of said optical scanner means and compensation signals indicative of the temperature drift of said optical scanning means;

a pick-up camera so positioned that its viewing field covers a specified area on said workpiece support table which area encompasses the area being scanned by said coincident laser beams, said pick-up camera scanning said specified area and producing video signals indicative of an image of said specified area and therefore including video information representative of the position of said second laser beam on said specified area; and compensation circuit means for generating said compensation signals as a function of both said position signals and said input machine data signals.

5. A laser beam machining apparatus according to claim 4, wherein said means for optically coupling said first and second laser beams comprises a half mirror having first and second opposed surfaces, said first surface receiving said first laser beam, said second surface receiving said second laser beam.

6. A laser beam machining apparatus according to claim 5, further including a first laser for generating said first laser beam and a second laser for generating said second laser beam.

7. A laser beam machining apparatus according to claim 4, wherein said optical scanner means comprises:
first and second optical scanners which are pivotal along respective axes and are so located that said coincident laser beams are first reflected from a first one of said scanners to a second one of said scaners and then to said surface of said workpiece supporting table, the angular orientation of said first and second scanners along their respective said axes determining the position of said coincident beams on said workpiece supporting table; and
a scanner driving circuit for controlling the angular position of said first and second scanners along their respective said axes as a function of said machining and compensation signals.

8. A process for machining a workpiece, comprising the steps of:
optically coupling a first laser beam used to machine a workpiece with a second laser beam used to detect the position of said workpiece such that the optical axes of said first and second laser beams are coincident with one another;
deflecting said coincident laser beams using at least first and second optical scanners in such a manner that said coincident laser beams will scan, along two dimensions, the surface of a workpiece supporting table, said scanning operation being carried out as a function of both input machine data signals indicating the desired scanning operation of said optical scanning means and compensation signals indicating the temperature drift of said optical scanning means;
using a pick-up camera so positioned that its viewing field covers a specified area on said workpiece supporting table which area encompasses the area being scanned by said coincident laser beams, and generating video signals indicative of an image of said specified area and therefore including video information representative of the position of said second laser beam on said specified area; and generating said compensation signals as a function of both said position signals and said input machine data signals.

* * * * *